(12) United States Patent
Götzfried et al.

(10) Patent No.: US 6,236,570 B1
(45) Date of Patent: May 22, 2001

(54) SLIDE-IN RACK FOR A HARD-DISK DRIVE WITH A "HOT-REPLACE" CAPABILITY

(75) Inventors: Manfred Götzfried, Königsbrunn; Anton Käsmayr, Zusmarshausen; Michael Lanz, München, all of (DE)

(73) Assignee: Siemens Nixdorf Informationssysteme Aktiengesellschaft, Paderborn (DE)

( * ) Notice: Subject to any disclaimer, the term of this patent is extended or adjusted under 35 U.S.C. 154(b) by 0 days.

(21) Appl. No.: 09/117,474

(22) PCT Filed: Jan. 28, 1997

(86) PCT No.: PCT/DE97/00154

§ 371 Date: Jul. 29, 1998

§ 102(e) Date: Jul. 29, 1998

(87) PCT Pub. No.: WO97/28498

PCT Pub. Date: Aug. 7, 1997

(30) Foreign Application Priority Data

Jan. 29, 1996 (DE) .............................. 196 03 092

(51) Int. Cl.[7] ...................................... G06F 1/16
(52) U.S. Cl. .................. 361/725; 361/726; 364/200; 439/928
(58) Field of Search ....................... 361/725, 726, 361/727, 683; 364/200; 439/377, 928; 174/52.1

(56) References Cited

U.S. PATENT DOCUMENTS

| | | | |
|---|---|---|---|
| 4,754,397 | 6/1988 | Varaiya et al. | 364/200 |
| 5,277,615 | 1/1994 | Hastings et al. | 439/377 |
| 5,349,483 | 9/1994 | Tsai | 361/725 |
| 5,694,290 | * 12/1997 | Chang | 361/685 |
| 5,715,146 | * 2/1998 | Hoppal | 361/796 |
| 5,767,445 | * 6/1998 | Wu | 361/685 |
| 6,058,016 | * 5/2000 | Anderson et al. | 361/727 |

FOREIGN PATENT DOCUMENTS

| | | |
|---|---|---|
| 94 09 541 | 9/1994 | (DE) . |
| 0 425 170 A2 | 5/1991 | (EP) . |
| WO 96/00938 | 1/1996 | (WO) . |

OTHER PUBLICATIONS

IBM Technical Disclosure Bulletin vol. 38, No. 08, Aug. 1995.

* cited by examiner

Primary Examiner—Leo P. Picard
Assistant Examiner—Hung Van Duong
(74) Attorney, Agent, or Firm—Schiff Hardin & Waite

(57) ABSTRACT

A slide-in module for hard disk drives which enables a "hot-replace" function that assures continuous motions, a precise guidance when replacing hard disk drives and an all around shielding in the built-in condition. The slide-in module includes ejectors laterally inserted into the front, a shielding plate behind the front and contact rails laterally contactable from the outside at side walls having angle pieces that are electrically connectable to grounding surfaces of a hard disk drive arranged within the slide-in module.

4 Claims, 2 Drawing Sheets

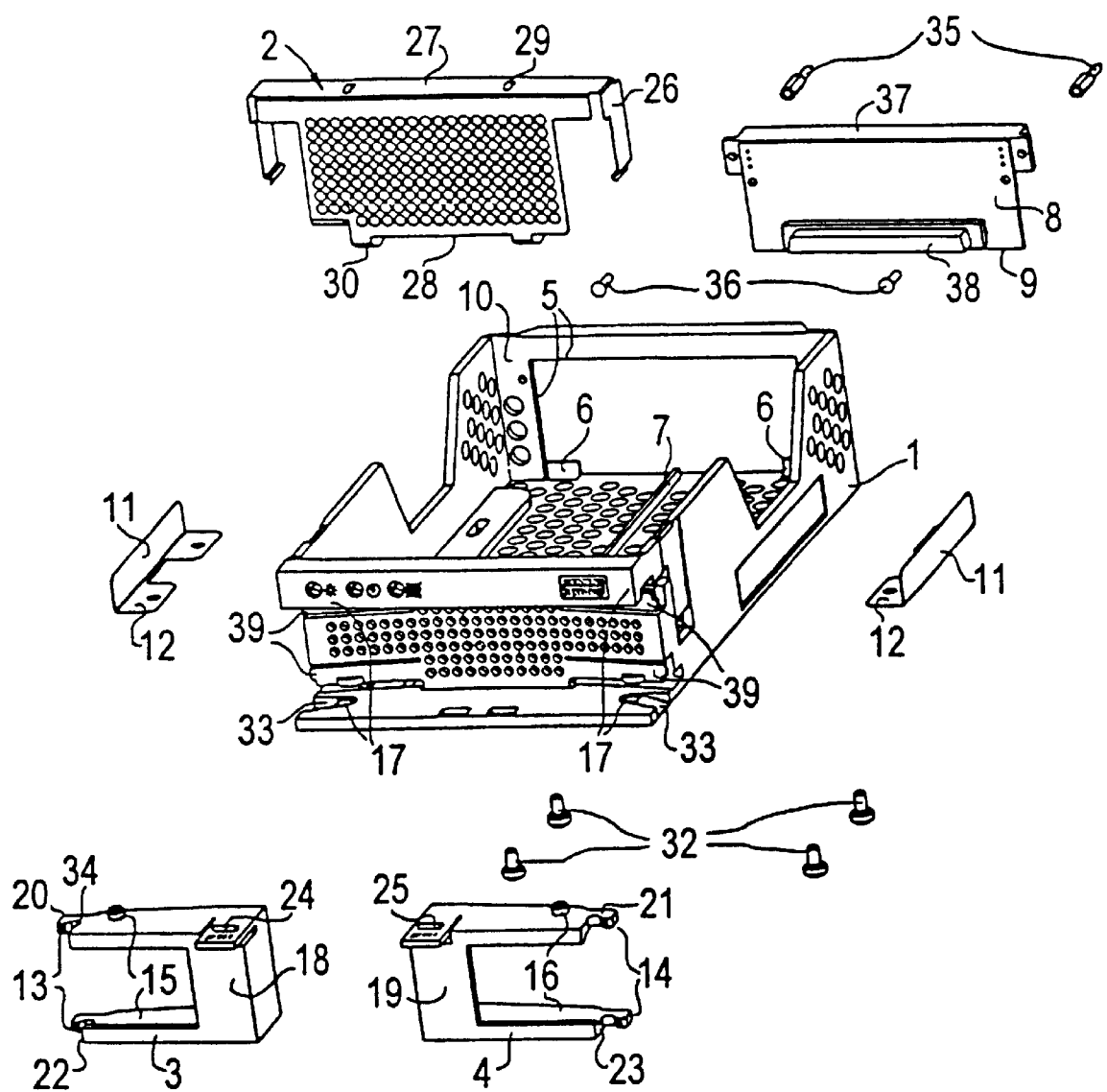

SLIDE-IN RACK FOR A HARD-DISK DRIVE WITH A "HOT-REPLACE" CAPABILITY

The present invention is directed to a slide-in module for hard disk drives which enables a "hot-replace" function.

DESCRIPTION OF THE PRIOR ART

High-grade modern data processing systems currently assume, and modern software requires, that disk drives can be exchanged and replaced during operation of the system. This means that screw-fastening assemblies are foregone and simpler [sic ] disk replacement systems implemented. The sensitive mechanism of high-capacity drives does not allow jerky movements even when replacing a disk, such movements would damage the hard disks. Imprecise guidances destroy the components of plug-type connections as well. Further, all around shielding deteriorates the functionability of the hard disk drives.

The publication U.S. Pat. No. 5,277,615 discloses a slide-in module for hard disk drives which enables a "hot-replace" function that fundamentally allows continuous motions upon insertion or removal of the slide-in module.

SUMMARY OF THE INVENTION

It is therefore an object of the present invention to specify a slide-in module for hard disk drives which enables a "hot-replace" function which allows for, continuous movements, which assures precise guidance when replacing hard disk drives, and which provides all around shielding in the built-in condition.

The slide-in module can be precisely guided in a shaft. Ejectors allow a continuous movement when pulling or plugging the slide-in module. Lateral angle pieces connectable to ground and shielding plates that shield the front of the module enable the hermetic sealing of the hard disk drives in the built-in condition.

Entry bevels for axle projections of the ejectors enable the simple, snappable insertion of the ejectors into the front of the housing of the slide-in module. Hooks implemented at leg ends of the ejectors assure a dependable hooking at allocated parts. Guide pins at a flat module fixed to the stern wall increase the precision of the guidance of the slide-in module.

More specifically, in an embodiment of the present invention, a slide-in module for hard disk drives is provided which includes: a housing having a floor, two side walls, a stem wall and a substantially open front end; a pair of substantially U-shaped ejectors attached to the front end of the housing, each ejector formed with a pair of legs and a web part disposed therebetween wherein the web parts are adjacently positioned near a center of the front end and their respective leg pairs extend outwardly therefrom, each leg respectively having an axle projection attached thereto wherein a pair of axle projections on an ejector engage appertaining front end recesses of the housing to form a rotational axis for the ejector such that the ejectors may be outwardly opened in window-like fashion with respect to the housing; a pair of spring fingers, each spring finger attached to one web part of an ejector for engagement with a closure recess on the housing when the ejector is closed with respect to the housing, each spring finger including an outwardly projecting catch nose for operational engagement with a human appendage wherein the respective spring finger may be disengaged with the closure recess and the ejector opened; a front shielding plate positioned behind the front end of the housing, the front shielding plate including lateral arm parts extending over the side walls of the housing and being fixedly engaged within side recesses in the side walls, the front shielding plate having an upper edge with upwardly projecting contact humps and having a lower edge with downwardly projecting contact humps which extend through lower recesses in the floor of the housing; at least one stern wall supporting edge member extending from a rear recess in the stern wall; at least one floor supporting edge member extending from a rear edge of the floor; a flat module positioned over the rear recess of the stern wall and between the at least one stern wall supporting edge member and the at least one floor supporting edge member; and a pair of contact rails, each contact rail attached adjacent a side wall of the housing for lateral outside contact, each contact rail further including an angle piece projecting into the housing proximate to the floor for electrical connection to a grounding surface of a hard disk drive arranged inside the housing.

In an embodiment, the slide-in module further includes entry bevels formed adjacent the front end recesses of the housing, the legs of the ejectors being compressed so as to guide the axle projections along the entry bevels prior to engagement with the front end recesses.

In an embodiment, the slide-in module further includes a hook member formed at an end of each leg of the ejectors wherein the hook member projects outwardly beyond the side wall when the ejector is in a closed position and projects into an interior of the housing when the ejector is in an open position, and wherein the hook member engages a cooperating holder of a drive shaft when the housing is inserted into the shaft and the ejector moved into the closed position.

In an embodiment, the slide-in module further includes attachment members for securing the flat module to the stem wall.

Additional features and advantages of the present invention are described in, and will be apparent from, the Detailed Description of the Preferred Embodiments and the Drawings.

DESCRIPTION OF THE DRAWINGS

FIG. 2 shows the slide-in module according to FIG. 1 in an exploded view.

DETAILED DESCRIPTION OF THE PREFERRED EMBODIMENTS

Figure 1:
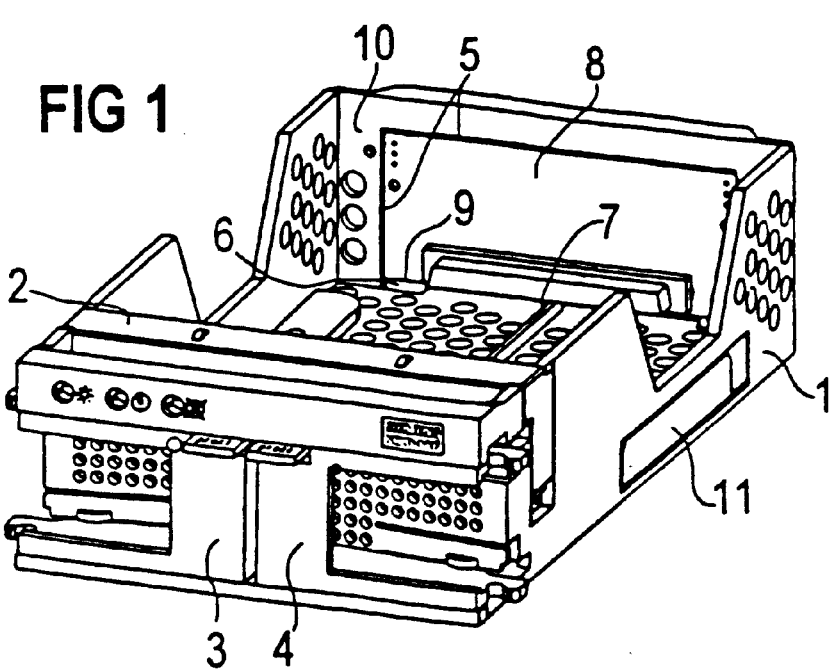
FIG. 1 shows a slide-in module of the present invention in a perspective, overall view.

The slide-in module shown in FIG. 1 includes a drawer-like housing 1 which is handled like a drawer. The slide-in module acts in a metallic box that is not shown in detail in the FIG. 1. Except for the front side, the metallic box includes a shielding wall on all sides. Wherein the module is thus shielded toward all sides by the metallic box.

The shielding of the front side of the module occurs within the slide-in module. The shielding of the front side is accomplished with a front shielding plate 2 that is arranged behind the front of the housing 1. Further particulars about the front shielding plate 2 shall follow later.

Ejectors 3, 4 that are laterally pushed into the front side of the module are arranged at the front of the housing 1, a first thereof being a left ejector 3 and a second being a right ejector 4.

A recess 5 is provided in the stern wall of the housing 1. Supporting edges 6 and 7 are allocated to the recess 5. The allocation is established in such a way that a flat module 8 having a base edge 9 can be first introduced and raised up between the supporting edges 6 and 7 obliquely from outside the housing 1 through the recess 5 and then can be fixed to the stern wall against parts 10.

At the lateral walls of the module, the housing 1 includes contact rails 11 have which are laterally contactable from the outside. Contact rail 11 have angle pieces 12 (FIG. 2) projecting into the housing 1 close to the floor of the module. Angle pieces 12 can be electrically connected to grounding surfaces of a hard disk drive which may be arranged inside the housing 1.

Some details mentioned in conjunction with FIG. 1 can be more clearly seen in FIG. 2. The ejectors 3 and 4 are fashioned U-shaped in front view. Hooks 13, 14 are arranged at their respective leg ends. Further, axle projections 15, 16 are arranged in pairs at the legs of their respective ejectors 3 and 4 in the region of the leg ends. Upon insertion of the ejectors 3, 4 into the housing 1, the axle projections 15, 16 engage appertaining recesses 17 at the housing 1. The axle projections 15, 16 act as rotational axes in the recesses 17. The effect is such that the ejectors 3, 4 can be opened window-like wherein webs 18, 19 are movable toward the front and outside of the module proceeding from the middle of the front. The result thereof is that the hooks 13, 14 arranged at the leg ends are movable from a position (see FIG. 1) projecting beyond the lateral dimensions of the housing 1 into a position arranged within the outside dimensions of the housing 1. A further result is that back edges 20, 21 of the hooks 13, 14 are replaced by salient edges 22, 23 laterally projecting beyond the outside dimensions of the housing 1 at the tips of the leg ends of the U-shaped ejectors 3, 4.

The webs 18, 19 exhibit such a width, depth and recess that at least human index fingers can be engaged behind the webs 18, 19.

Above the webs 18, 19, the ejectors 3, 4 include spring fingers 24, 25 that project beyond the front of the module. Catch noses are arranged on the cover surfaces of the spring fingers 24, 25 for engagement in recesses arranged inside the housing 1 in an interlocked position. For moving the ejectors 3, 4 out of the interlocked position, the spring fingers 24, 25 are pressed down; for example, with the human thumb. The spring fingers 24, 25 thus assume a lowered position, as a result whereof the catch noses slide out of the appertaining recesses in the housing 1.

The front shielding plate 2 arranged behind the front of the housing 1 includes lateral arm parts 26 that are arranged gripping over the sidewalls of the housing 1. Coming from outside the housing 1, parts of the arm parts 26 engage recesses at the sidewalls of the housing 1. These parts thereby snap resiliently into the recesses and thus fix the front shielding plate 2. As a result of the resilient snap-in mechanism, the front shielding plate 2 can be easily released and removed.

Contact humps 29, 30 are formed at an upper edge 27 and a lower edge 28 of the front shielding plate 2, respectively. Recesses are provided in the floor of the housing 1 for the contact humps 30 at the under edge 28 of the front shielding plate 2, wherein the contact humps 30 project through these recesses and beyond the outside dimensions of the housing 1. In particular, the contact humps 30 arranged at the lower edge 28 of the front shielding plate 2 are resiliently formed.

Figure 3:
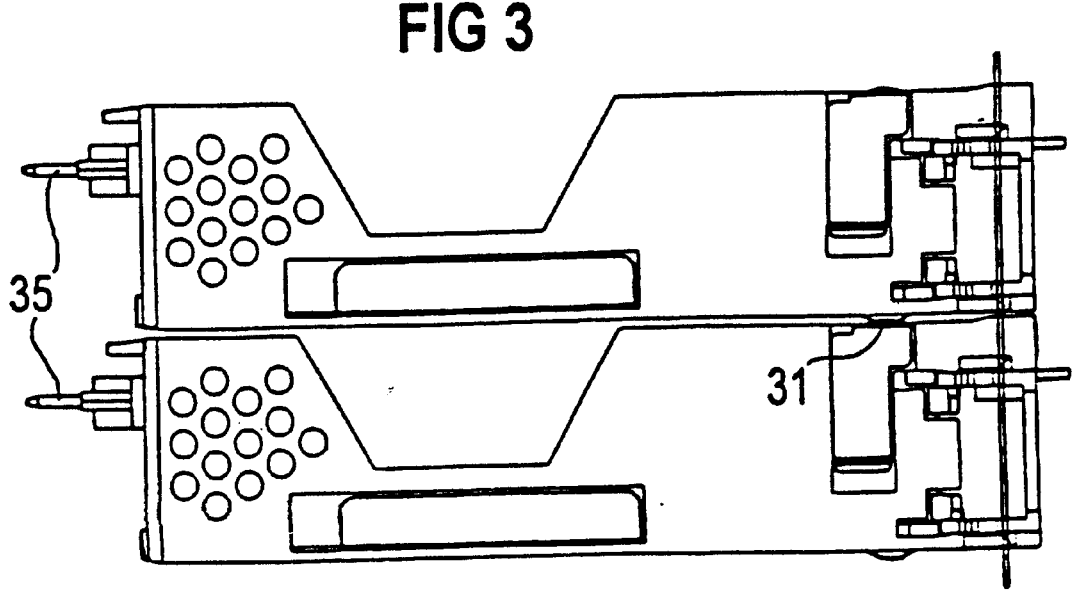
FIG. 3 shows a tower-like arrangement composed of a plurality of slide-in modules according to FIG. 1 in a side view.

In the arrangement shown in FIG. 3, wherein a plurality of slide-in modules are arranged above one another in tower-like fashion, contact humps 30 at the lower edge 28 of an upper slide-in module contact the contact humps 29 at the upper edge 27 of a lower slide-in module. In FIG. 3, contact point 31 references the described location.

When the uppermost front shielding plate 2 of an uppermost slide-in module is contacted by corresponding contact humps connected to a slide-in module housing and when the contact humps 30 at the lower edge 28 of a lowest slide-in module of an arrangement according to FIG. 3 again contact the slide-in module housing, a complete shielding at the front side of the slide-in modules is established. A further improvement of the shielding is achieved when the arm parts 26 of the front shielding plates 2 are likewise laterally contacted. When springs connected to the slide-in module housing also contact the contact rails 11 of the slide-in modules, the hard disk drives arranged in the slide-in modules can be grounded. The grounding occurs via the angle pieces 12 that can be screwed to ground parts of the hard disk drives with screws 32.

Entry bevels 33 for the axle projections 15, 16 of the ejectors 3, 4 are provided for the lateral insertion of the ejectors 3, 4. The legs of the U-shaped ejectors 3, 4 are brought into a compressed position by the bevels before they engage the appertaining recesses 17 at the housing 1.

The hooks 13, 14 at the leg ends of the ejectors 3, 4 include undercut edges 34 with which an improved gripping effect is achieved.

Guide pins 35 which are outwardly directed relative to the housing 1 and parallel to their insertion direction that improve the guidance properties of the slide-in module and can be provided at the flat module 8 fixed to the stern wall. Screws 36 can thereby fix the flat module 8 to the stern wall as well as hold the guide pins 35 in one work step. Advantageously, the guide pins 35 are in communication with an edgeboard connector 37, so that a precise guidance for the contacts of the edgeboard connector 37 is established.

Another edgeboard connector 38 maybe provided via which a hard disk drive arranged in the slide-in module is contacted. The electrical connection toward the outside occurs via the flat module 8 that connects the two edgeboard connectors 37 and 38 to one another.

A few assembly steps are explained in greater detail below;

The ejectors 3, 4 are laterally inserted into the front of the housing 1. To that end, the parts are inserted such that they automatically have their axle projections 15, 16 coming to lie next to the entry bevels 33 of the housing 1. The legs of the ejectors 3, 4 are pressed up or down by pulling the ejectors 3, 4 transversely toward the middle. As a result thereof, spring surfaces 39 (FIG. 2) of the housing 1 are bent toward the back. The path for snapping the axle projections 15, 16 into the recesses 17 thereby becomes free. With the centering of the axle projections 15, 16 in the recesses, the legs of the ejectors 3, 4 are again pressed apart. The spring surfaces 39 can thereby return toward the front into their quiescent position. The legs of the ejectors 3, 4 can now no longer be pressed together. An unintentional disengagement is thus no longer possible.

Pressing on the front surfaces of the webs 18, 19 of the ejectors 3, 4 effects a snapping of the catch noses on the cover surfaces of the spring fingers 24, 25 in the housing 1.

For assembling the front shielding plate 2, the arm parts 26 are bent apart and brought down over the sidewalls of the housing 1. A hooking of the front shielding plate 2 into the lateral openings of the housing 1 is achieved by pressing the arm parts 26 together.

For mounting the flat module 8, the flat module 8 is brought into position between the supporting edges 6, 7 obliquely from behind. By perpendicularly raising the flat module 8, the two screws 36 can be guided through correspondingly arranged holes from within the housing 1. Screwing the two guide pins 35 onto the two screws 36 secures the flat module 8.

For mounting the contact rails 11, a hard disk drive is placed into the housing 1 from above. By displacement thereof toward the back, the multi-pole plug parts of the hard disk drive and flat module 8 are connected to one another. Both contact rails are subsequently laterally pushed through, for example, slots of the housing 1. The ground contact of the hard disk drive is made planar to the outsides by flanging hard disk drive and angle pieces 12 of the contact rails 11 together with the screws 32.

The following is with respect to the insertion of the slide-in module into a drive shaft:

The ejectors 3, 4 are first released. To this end, a thumb pressed onto the front edges of the cover surfaces of the spring fingers 24, 25 and the ejectors 3, 4 are to be opened window-like until they reside parallel to the slide-in direction. The entire slide-in module is plugged into the desired position of the drive shaft until the salient edges 22, 23 of the ejectors 3, 4 come to lie against a housing wall of the drive shaft. By swivelling the ejectors 3, 4, the hooks 13, 14 engage cooperating holders at the drive shaft so that the slide-in module is pulled into the shaft with the hooks 13, 14. The leading guide pins 35 thereby position the plug connectors for the slide-in module and a platter of the back side. The ejectors 3, 4 that snap in lock the slide-in module in the drive shaft and end the jolt-free installation. The release of the slide-in module is only enabled by pressing on the front edges of the cover surfaces of the spring fingers 24, 25 of the ejectors 3, 4 with simultaneous swivelling of the ejectors 3, 4. The pressing with the back edges 20, 21 at an inner housing part of the drive shaft presses the slide-in module from the plug of the platter at the back side.

In the installed condition of the slide-in module, the contact rails 11 are contacted with springs to the sidewalls of the drive shaft and thus produce a desired ground contact between the hard disk drive and the drive shaft or, respectively, housing of the overall system.

In the installed condition of the slide-in module, the front shielding plates 2 represent a closed, frontal shielding surface. As already mentioned, each front shielding plate 2 has six contact points. Of these, two contact points are produced by coinings on the upper side with the foot springs of the front shielding plate 2 lying thereabove in the slide-in module lying thereabove. Each slide-in module thus has two upper and two lower shield contacts. Moreover, the lateral surfaces of the arm parts 26 contact each from shielding plate 2 to a respective spring in the drive shaft.

Although the present invention has been described with reference to specific embodiments, those of skill in the art will recognize that changes may be made thereto without departing from the spirit and scope of the invention as set forth in the hereafter appended claims.

What is claimed is:

1. A slide-in module for hard disk drives, comprising:
    a housing having a floor, two side walls, a stern wall and a substantially open front end;
    a pair of substantially U-shaped ejectors attached to the front end of the housing, each ejector formed with a pair of legs and a web part disposed therebetween wherein the web parts are adjacently positioned near a center of the front end and their respective leg pairs extend outwardly therefrom, each leg respectively having an axle projection attached thereto wherein a pair of axle projections on an ejector engage appertaining front end recesses of the housing to form a rotational axis for the ejector such that the ejectors may be outwardly opened in window like fashion with respect to the housing;
    a pair of spring fingers, each spring finger attached to one web part of an ejector for engagement with a closure recess on the housing when the ejector is closed with respect to the housing, each spring finger including an outwardly projecting catch nose for operational engagement with a human appendage wherein the respective spring finger may be disengaged with the closure recess and the ejector opened;
    a front shielding plate positioned behind the front end of the housing, the front shielding plate including lateral arm parts extending over the side walls of the housing and being fixedly engaged within side recesses in the side walls, the front shielding plate having an upper edge with upwardly projecting contact humps and having a lower edge with downwardly projecting contact humps which extend through lower recesses in the floor of the housing;
    at least one stern wall supporting edge member extending from a rear recess in the stern wall;
    at least one floor supporting edge member extending from a rear edge of the floor;
    a flat module positioned over the rear recess of the stern wall and between the at least one stem wall supporting edge member and the at least one floor supporting edge member; and
    a pair of contact rails, each contact rail attached adjacent a side wall of the housing for lateral outside contact, each contact rail further including an angle piece projecting into the housing proximate to the floor for electrical connection to a grounding surface of a hard disk drive arranged inside the housing.

2. A slide-in module as claimed in claim 1, further comprising:
    entry bevels formed adjacent the front end recesses of the housing, the legs of the ejectors being compressed so as to guide the axle projections along the entry bevels prior to engagement with the front end recesses.

3. A slide-in module as claimed in claim 1, further comprising:
    hook member formed at an end of each leg of the ejectors wherein the hook member projects outwardly beyond the side wall when the ejector is in a closed position and projects into an interior of the housing when the ejector is in an open position, and wherein the hook member engages a cooperating holder of a drive shaft when the housing is inserted into the shaft and the ejector moved into the closed position.

4. A slide-in module as claimed in claim 1, further comprising:
    attachment members for securing the flat module to the stern wall.

* * * * *